(12) United States Patent
Billingsley (10) Patent No.: US 12,024,097 B1
(45) Date of Patent: Jul. 2, 2024

(54) VEHICLE CENTER CONSOLE COVER

(71) Applicant: Jimmie Billingsley, Hickory Hill, TN (US)

(72) Inventor: Jimmie Billingsley, Hickory Hill, TN (US)

( * ) Notice: Subject to any disclaimer, the term of this patent is extended or adjusted under 35 U.S.C. 154(b) by 511 days.

(21) Appl. No.: 17/373,837

(22) Filed: Jul. 13, 2021

(51) Int. Cl.
*B60R 7/04* (2006.01)
*B60R 13/02* (2006.01)

(52) U.S. Cl.
CPC ............ *B60R 13/0206* (2013.01); *B60R 7/04* (2013.01)

(58) Field of Classification Search
CPC ......... B60R 13/0206; B60R 7/00; B60R 7/04; B60R 7/06; B60R 2011/0003; B60R 2011/0007; B60R 2011/0059; B60R 13/0262; B60R 21/04; B60N 2/58; B60N 2/5816; B60N 2/70; B60N 2/7005; B60N 2/787; B60N 2/79; B60N 2/793; B60N 2/60; A47C 7/546; A47C 20/023; A47C 31/11; B60J 11/06
USPC ............. 296/1.08, 1.09, 24.34, 37.8, 136.01, 296/136.1, 153; 297/188.18, 22, 227, 297/228, 228.11, 228.12, 228.13, 411.2, 297/411.23, 452.63, 411.21, 411.22, 297/411.24, 411.25, 461; 248/118; 150/158
See application file for complete search history.

(56) References Cited

U.S. PATENT DOCUMENTS

| | | | |
|---|---|---|---|
| 4,708,388 A | 11/1987 | Zacharczuk | |
| 4,858,995 A | 8/1989 | Young | |
| 5,332,288 A * | 7/1994 | Coates | B60N 2/787 296/153 |
| 5,605,374 A * | 2/1997 | Perry | A47C 31/11 297/227 |
| 5,979,987 A * | 11/1999 | Rich | B60N 2/763 297/DIG. 6 |
| 7,431,396 B1 * | 10/2008 | Dasso | A47C 7/546 297/227 |
| D679,647 S | 4/2013 | Tuten | |
| 8,528,956 B1 * | 9/2013 | Winiger | B60R 7/04 296/37.8 |
| 9,756,948 B1 * | 9/2017 | Albite | A47C 7/624 |
| 10,328,881 B2 * | 6/2019 | Bozio | B60N 2/75 |
| 10,357,111 B2 | 7/2019 | Maebe | |
| D969,056 S * | 11/2022 | Wegesin | D12/401 |
| 2003/0189363 A1* | 10/2003 | Artsvelyan | B60N 2/787 297/227 |
| 2016/0297378 A1 | 10/2016 | Humphrey | |
| 2017/0150825 A1 | 6/2017 | Lindberg | |

* cited by examiner

*Primary Examiner* — Dennis H Pedder

(74) *Attorney, Agent, or Firm* — Kyle A. Fletcher, Esq.

(57) ABSTRACT

The vehicle center console cover comprises a composite covering, a plurality of strap structures, a skirt, and a vehicle. The vehicle further comprises a center console. The center console is located in the cab of the vehicle. The center console refers to control devices and a storage compartment that are located in the cab of the vehicle. The superior surface storage compartment of the center console forms an armrest. The vehicle center console cover encloses the armrest of the center console. The plurality of strap structures and the skirt attach the composite covering. The composite covering forms a cushioned protective structure that encloses the superior surface of the center console. The skirt and the plurality of straps secure the composite covering to the center console.

15 Claims, 4 Drawing Sheets

VEHICLE CENTER CONSOLE COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and seats of vehicles, more specifically, an adaptation for the additional use of the armrests. (B60N2/793)

SUMMARY OF INVENTION

The vehicle center console cover comprises a composite covering, a plurality of strap structures, a skirt, and a vehicle. The vehicle further comprises a center console. The center console is located in the cab of the vehicle. The center console refers to control devices and a storage compartment that are located in the cab of the vehicle. The superior surface storage compartment of the center console forms an armrest. The vehicle center console cover encloses the armrest of the center console. The plurality of strap structures and the skirt attach the composite covering. The composite covering forms a cushioned protective structure that encloses the superior surface of the center console. The skirt and the plurality of straps secure the composite covering to the center console. These together with additional objects, features and advantages of the vehicle center console cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle center console cover in detail, it is to be understood that the vehicle center console cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle center console cover.

It is therefore important that the claims be regarded as including such equivalent construction insofar as they do not depart from the spirit and scope of the vehicle center console cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
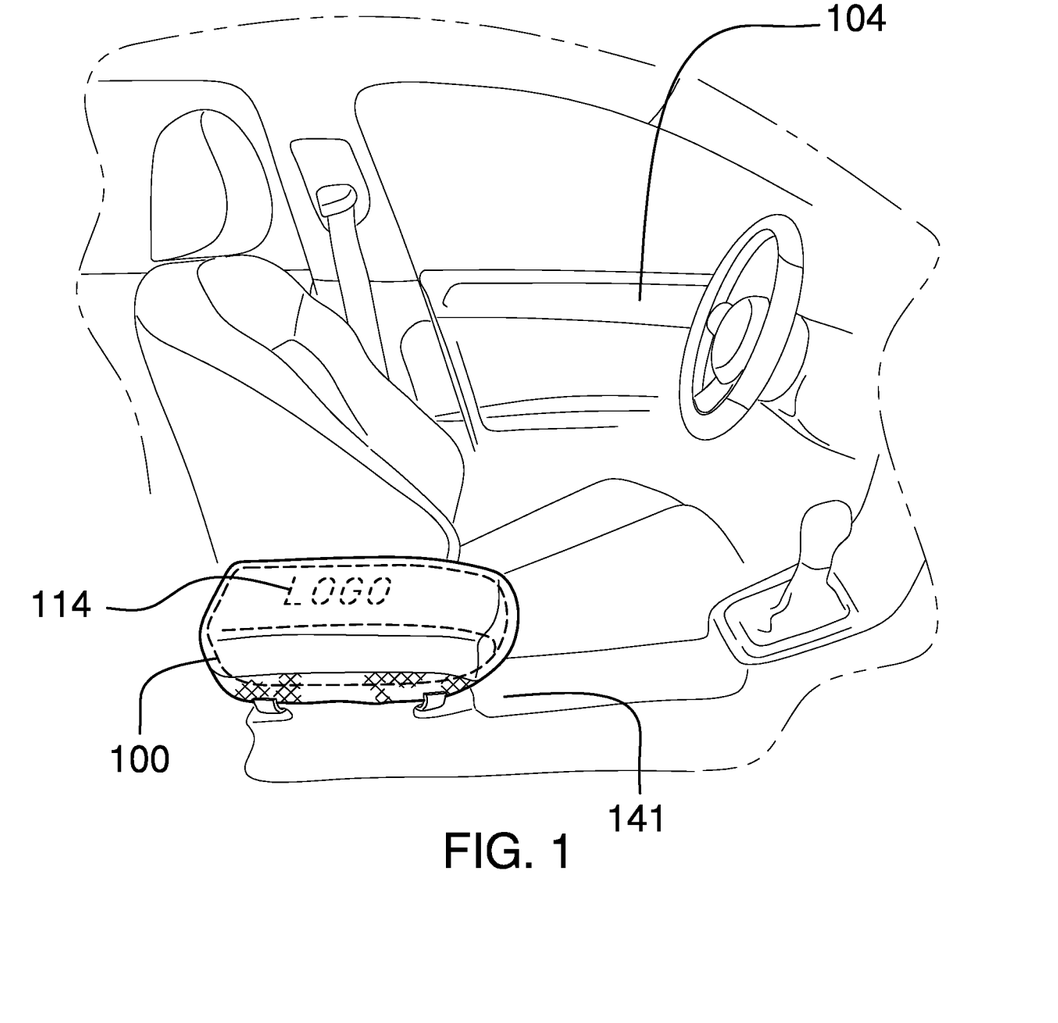
FIG. 1 is an in-use view of an embodiment of the disclosure.
Figure 2:
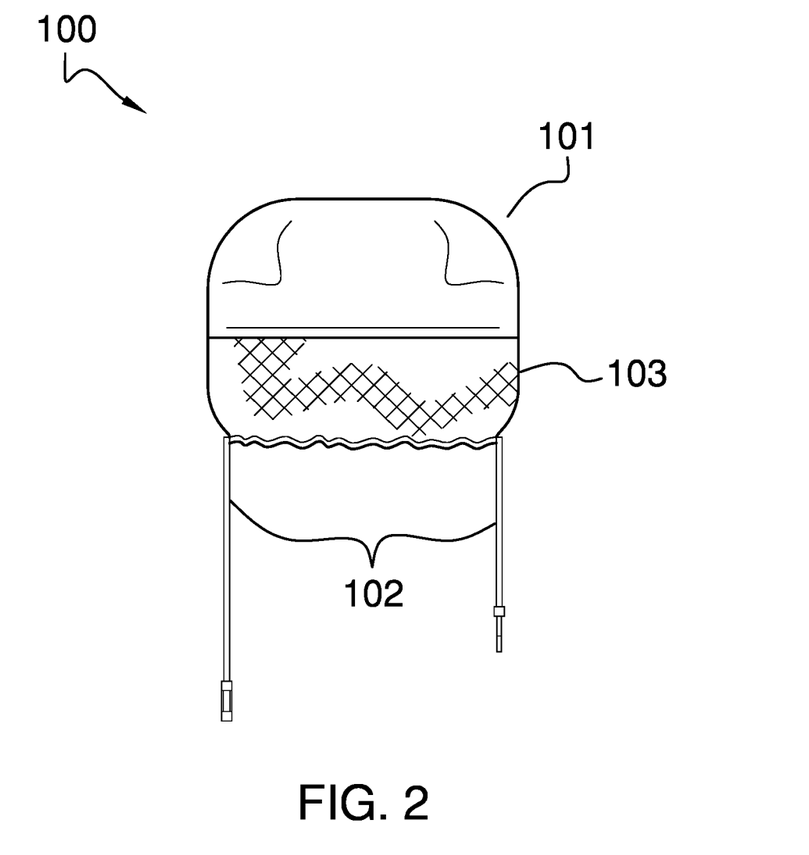
FIG. 2 is a front view of an embodiment of the disclosure.
Figure 3:
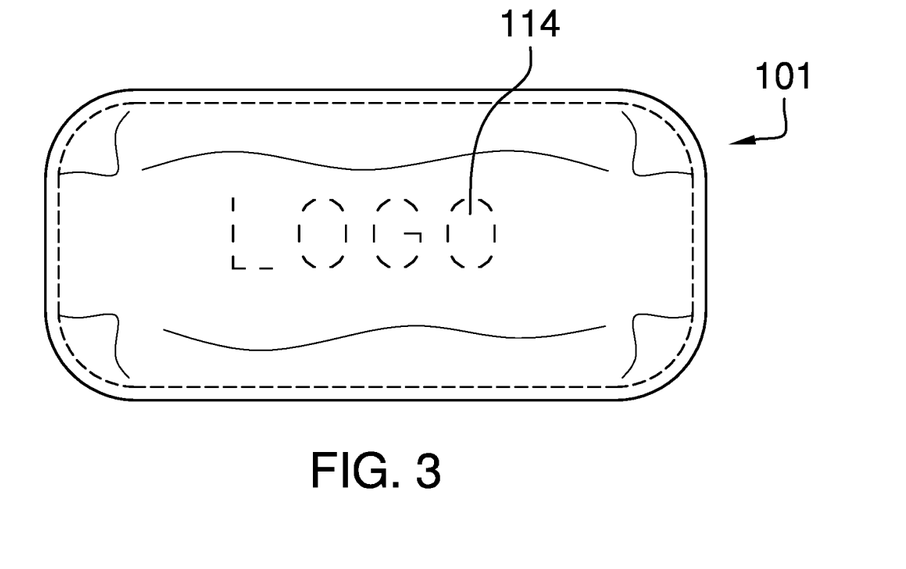
FIG. 3 is a top view of an embodiment of the disclosure.
Figure 4:
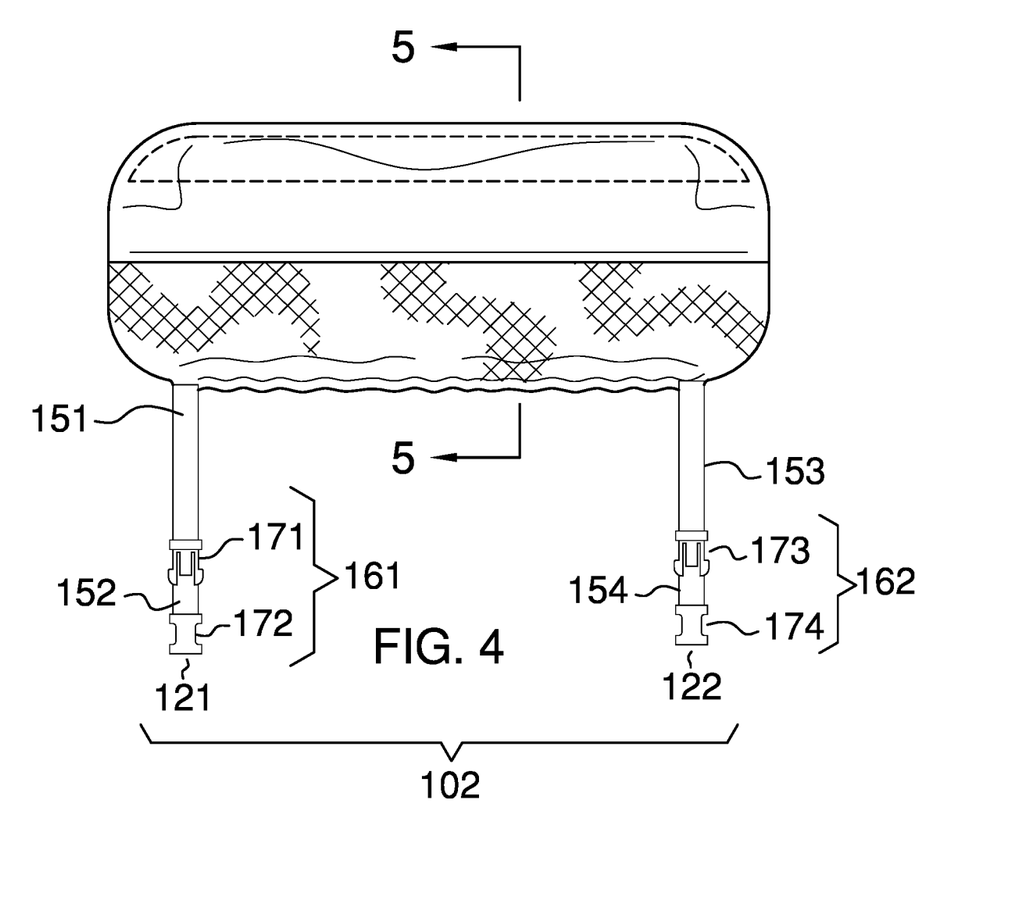
FIG. 4 is a side view of an embodiment of the disclosure.
Figure 5:
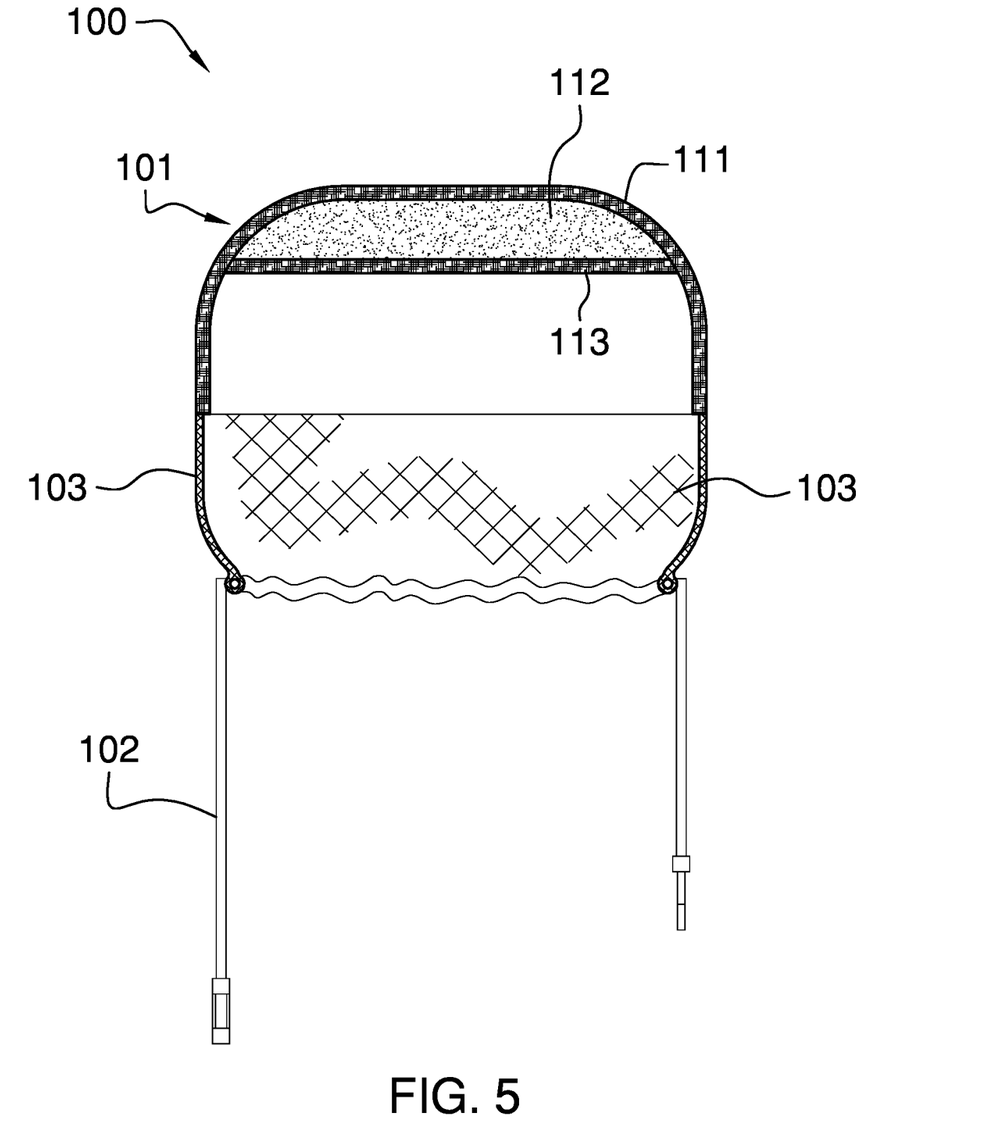
FIG. 5 is a cross-sectional view of an embodiment of the disclosure across 5-5 as shown in FIG. 4.

Detailed reference will now be made to one or more potential embodiments of the disclosure, which are illustrated in FIGS. 1 through 5.

The vehicle center console cover 100 (hereinafter invention) comprises a composite textile covering 101, a plurality of strap structures 102, a skirt 103, and a vehicle 104. The vehicle 104 further comprises a center console 141. The center console 141 is located in the cab of the vehicle 104. The center console 141 refers to control devices and a storage compartment that are located in the cab of the vehicle 104. The superior surface storage compartment of the center console 141 forms an armrest. The invention 100 encloses the armrest of the center console 141. The plurality of strap structures 102 and the composite textile covering 101 attach to the skirt 103. The composite textile covering 101 forms a cushioned protective structure that encloses the superior surface of the center console 141. The skirt 103 and the plurality of strap structures 102 secure the composite textile covering 101 to the center console 141. The vehicle 104 is defined elsewhere in this disclosure.

The skirt 103 is a sheeting structure. The skirt 103 is a textile based structure. The skirt 103 is an elastic structure. The skirt 103 forms the inferior structure of the invention 100. The skirt 103 forms a tubular textile structure. The skirt 103 attaches to the perimeter of the superior sheeting 111 of the composite textile covering 101. The superior sheeting 111 is described elsewhere in this disclosure. The skirt 103 secures the invention 100 to the armrest formed by the center console 141.

The skirt 103 acts as a spring. Specifically, when the armrest of the center console 141 inserts into the skirt 103, a radial force is applied to the skirt 103 in a direction perpendicular to the center axis of the tubular structure of the skirt 103. The applied radial force elongates the span of the diameter of the skirt 103 in the direction perpendicular to the center axis of the skirt 103. The elasticity of the skirt 103 creates a force that opposes the displacement created by the applied force. The elasticity of the skirt 103 returns the skirt 103 to its relaxed shape. The armrest of the center console 141 will prevent the skirt 103 from returning to its relaxed shape. In this circumstance, the skirt 103 will apply a force projecting radially towards the center axis of the skirt that binds skirt 103 to the armrest of the center console 141.

The composite textile covering 101 is a sheeting structure. The composite textile covering 101 is a composite textile structure. The composite textile covering 101 is a textile based structure. The composite textile covering 101 is a padded structure. The composite textile covering 101 is a flexible structure. The composite textile covering 101 forms the superior structure of the invention 100. The composite textile covering 101 encloses the superior surface of the armrest formed by the center console 141. The composite textile covering 101 comprises a superior sheeting 111, a cushion 112, and an inferior sheeting 113.

The superior sheeting 111 is a sheeting structure. The superior sheeting 111 is a textile based structure. The superior sheeting 111 is a flexible structure. The superior sheeting 111 forms an exterior surface of the composite textile structure of the composite textile covering 101. The superior sheeting 111 forms the superior surface of the composite textile covering 101. The superior sheeting 111 forms the visible surface of the composite textile covering 101 when the composite textile covering 101 encloses the armrest formed by the center console 141. The superior sheeting 111 further comprises a logo image 114. The logo image 114 is an image that is formed on the visible surface of the superior sheeting 111. The logo image 114 is positioned on the superior sheeting 111 such that the logo image 114 lays over the superior surface of the armrest formed by the center console 141. The terms logo and image are defined elsewhere in this disclosure.

The inferior sheeting 113 is a textile based structure. The inferior sheeting 113 is a flexible structure. The inferior sheeting 113 attaches to the superior sheeting 111 to form a portion of the composite textile structure of the composite textile covering 101. The inferior sheeting 113 forms the surface of the composite textile structure of the composite textile covering 101 that is proximal to the armrest formed by the center console 141. The inferior sheeting 113 forms the inferior surface of the composite textile covering 101.

The cushion 112 is an elastomeric pad. The cushion 112 has a disk shape. The cushion 112 is sandwiched between the superior sheeting 111 and the inferior sheeting 113 to form the composite textile structure of the composite textile covering 101. The cushion 112 is positioned within the composite textile covering 101 such that the cushion 112 covers the superior surface of the armrest formed by the center console 141. The cushion 112 forms a protective structure. The elastic nature of the cushion 112 absorbs impacts that may damage either: a) to the armrest formed by the center console 141; or, b) a passenger in the vehicle 104.

Each of the plurality of strap structures 102 is a mechanical structure. Each of the plurality of strap structures 102 is a fastening device. Each of the plurality of strap structures 102 secures the composite textile covering 101 to the center console 141. Each of the plurality of strap structures 102 attaches to the skirt 103. The plurality of strap structures 102 comprises a first strap structure 121 and a second strap structure 122.

The first strap structure 121 is a fastening device. The first strap structure 121 removably attaches the composite textile covering 101 to the armrest formed by the center console 141. The first strap structure 121 binds the composite textile covering 101 to the armrest formed by the center console 141. The first strap structure 121 comprises a first webbing 151, a second webbing 152, and a first quick release buckle 161.

The first webbing 151 is a textile based structure. The first webbing 151 is a flexible structure. The first webbing 151 is a webbing. The edge of the first webbing 151 with the least span of distance attaches to the skirt 103 to form a fixed end. The free end of the first webbing 151 is the edge of the first webbing 151 that is distal from the fixed edge of the first webbing 151. The free end of the first webbing 151 removably attaches to the second webbing 152 to bind the composite textile covering 101 to the armrest formed by the center console 141.

The second webbing 152 is a textile based structure. The second webbing 152 is a flexible structure. The second webbing 152 is a webbing. The edge of the second webbing 152 with the least span of distance attaches to the skirt 103 to form a fixed end. The free end of the second webbing 152 is the edge of the second webbing 152 that is distal from the fixed edge of the second webbing 152. The free end of the second webbing 152 removably attaches to the free end of the first webbing 151 to bind the composite textile covering 101 to the armrest formed by the center console 141.

The first quick release buckle 161 is a quick release buckle. The quick release buckle is defined elsewhere in this disclosure. The first quick release buckle 161 removably attaches the free end of the first webbing 151 to the free end of the second webbing 152 to bind the first strap structure 121 to the composite textile covering 101. The first quick release buckle 161 comprises a first connector 171 and a second connector 172.

The first connector 171 is the connector of the first quick release buckle 161 that attaches to the free end of the first webbing 151. The second connector 172 is the connector of the first quick release buckle 161 that attaches to the free end of the second webbing 152. The first quick release buckle 161 secures the free end of the first webbing 151 to the free end of the second webbing 152 by inserting the first connector 171 into the second connector 172.

The second strap structure 122 is a fastening device. The second strap structure 122 removably attaches the composite textile covering 101 to the armrest formed by the center console 141. The second strap structure 122 binds the composite textile covering 101 to the armrest formed by the center console 141. The second strap structure 122 comprises a third webbing 153, a fourth webbing 154, and a second quick release buckle 162.

The third webbing 153 is a textile based structure. The third webbing 153 is a flexible structure. The third webbing 153 is a webbing. The edge of the third webbing 153 with the least span of distance attaches to the skirt 103 to form a fixed end. The free end of the third webbing 153 is the edge of the third webbing 153 that is distal from the fixed edge of the third webbing 153. The free end of the third webbing 153 removably attaches to the fourth webbing 154 to bind the composite textile covering 101 to the armrest formed by the center console 141.

The fourth webbing 154 is a textile based structure. The fourth webbing 154 is a flexible structure. The fourth webbing is a webbing. The edge of the fourth webbing 154 with the least span of distance attaches to the skirt 103 to form a fixed end. The free end of the fourth webbing 154 is the edge of the fourth webbing 154 that is distal from the fixed edge of the fourth webbing 154. The free end of the fourth webbing 154 removably attaches to the free end of the third webbing 153 to bind the composite textile covering 101 to the armrest formed by the center console 141.

The second quick release buckle 162 is a quick release buckle. The quick release buckle is defined elsewhere in this disclosure. The second quick release buckle 162 removably attaches the free end of the third webbing 153 to the free end of the fourth webbing 154 to bind the second strap structure 122 to the composite textile covering 101. The second quick release buckle 162 comprises a third connector 173 and a fourth connector 174.

The third connector 173 is the connector of the second quick release buckle 162 that attaches to the free end of the third webbing 153. The fourth connector 174 is the connector of the second quick release buckle 162 that attaches to the free end of the fourth webbing 154. The second quick release buckle 162 secures the free end of the third webbing 153 to the free end of the fourth webbing 154 by inserting the third connector 173 into the fourth connector 174.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bind: As used in this disclosure, to bind is a verb that means to tie or secure a first object to a second object using a strap, cord or webbing. Bind can also mean to tie or secure a plurality of similar first objects together by wrapping a second object around the plurality of similar first objects.

Buckle: As used in this disclosure, a buckle is a fastening device that is used for joining a first free end of a strap to a second free end of the same strap or a different strap. A buckle further comprises a first (also called the male) connector that is attached to the first free end and a second (also called the female) connector that is attached to the second free end. The male connector has a pin or other structure that is generally caught by a structure formed in the female connector.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite: As used in this disclosure, composite refers to a two-dimensional or three-dimensional structure that is formed from two or more distinctly identifiable sub-structures.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Composite Textile: As used in this disclosure, a composite textile is a multilayer fabric made of two or more joined layers of textile or sheeting materials.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Cushion: As used in this disclosure a cushion is an elastomeric structure formed that is used to prevent injury or damage to a person or object.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Fixed End: As used in this disclosure, a fixed end refers to the end of a cord or webbing that attaches to an object.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Free End: As used in this disclosure, a free end refers to the end of a cord or webbing that is not secured to an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition.

Indicia: As used in this disclosure, the term indicia refers to a set of markings that identify a sentiment.

Inferior: As used in this disclosure, the term inferior refers to a directional reference that is parallel to and in the same direction as the force of gravity when an object is positioned or used normally.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logo: As used in this disclosure, a logo is an image that presents the indicia of a sentiment that is associated with an organization or activity.

Nap: As used in this disclosure, a nap refers to one or more loose yarns that are incorporated in a textile such that the separated, or "raised," from the plane of the face of a textile. A nap may: 1) take the form of a loop; or 2) take the form of loose "ends" extending beyond the textile. Within this disclosure, the terms pile and nap may considered synonyms. A textile comprising a plurality of napped yarns is often referred to as a plush textile.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pad: As used in this disclosure, a pad is a disk-shaped mass of elastic material. A pad is often used: a) for protection against damage or injury; or b) grip security. Commonly used padding materials include, but are not limited to, polyurethane foam and silicone.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Relaxed Shape: As used in this disclosure, a structure is considered to be in its relaxed state when no shear, strain, or torsional forces are being applied to the structure.

Sandwich: As used in this disclosure, to sandwich means to insert a first disk-shaped structure between a second disk-shaped structure and a third disk-shaped structure to form a composite prism structure. Specifically: a) a first congruent end of the first disk-shaped structure is placed against a first interior congruent end of the second disk-shaped structure; and, b) a second congruent end of the first disk-shaped structure is placed against a second interior congruent end of the third disk-shaped structure. A first exterior congruent end of the second disk-shaped structure forms a first overall congruent end of the overall composite prism structure described in this definition. A second exterior congruent end of the third disk-shaped structure forms a second overall congruent end of the overall composite prism structure described in this definition. The second overall congruent end of the overall composite prism structure is distal from the first overall congruent end. The verb to sandwich describes the act of placing the second disk-shaped structure between the first disk-shaped structure and the third disk-shaped structure.

Sentiment: As used in this disclosure, a sentiment refers to a symbolic meaning or message that is communicated through the use of an image, potentially including a text based image.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Skirt: As used in this disclosure, a skirt is a structure that attaches to the inferior region of an object such that the portions of the exterior surface of the inferior region of the object are not visible through the skirt.

Strap: As used in this disclosure a strap is a strip of leather, cloth, or other flexible material, often with a buckle, that is used to fasten, secure, carry, or hold onto something.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Textile: As used in this disclosure, a textile is a material that is woven, knitted, braided or felted. Synonyms in common usage for this definition include fabric and cloth. The two surfaces of the textile with the greatest surface area are called the faces of the textile.

Tubular Textile: As used in this disclosure, a tubular textile is a textile that is woven, knitted, or braided into a seamless tube like shape.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The shape of a webbing is approximated by a rectangular disk shape. The two surfaces of a webbing with the greatest surface area are called the faces of the webbing.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle accessory comprising
a composite textile covering, a plurality of strap structures, a skirt, and a vehicle;
wherein the composite textile covering and the plurality of strap structures attach to the skirt;
wherein the composite textile covering, the skirt, and the plurality of strap structures attach to the vehicle;
wherein the vehicle further comprises a center console;
wherein the center console is located in a cab of the vehicle;
wherein a superior surface storage compartment of the center console forms an armrest;
wherein the vehicle accessory encloses the armrest of the center console;
wherein the composite textile covering forms a cushioned protective structure that encloses the superior surface of the center console;
wherein the skirt and the plurality of strap structures secure the composite textile covering to the center console;
wherein the skirt is a sheeting structure;
wherein the skirt is a textile based structure;
wherein the skirt is an elastic structure;
wherein the skirt forms the inferior structure of the vehicle accessory.

2. The vehicle accessory according to claim 1
wherein the skirt forms a tubular textile structure;
wherein the skirt attaches to the perimeter of the composite textile covering;
wherein the skirt secures the vehicle accessory to the armrest formed by the center console.

3. The vehicle accessory according to claim 2
wherein the skirt forms a spring;
wherein the skirt binds to the armrest of the center console.

4. The vehicle accessory according to claim 3
wherein the composite textile covering is a sheeting structure;
wherein the composite textile covering is a composite textile structure;
wherein the composite textile covering is a textile based structure;
wherein the composite textile covering is a padded structure;
wherein the composite textile covering is a flexible structure;
wherein the composite textile covering forms the superior structure of the vehicle accessory.

5. The vehicle accessory according to claim 4 wherein the skirt attaches to the perimeter of the superior sheeting of the composite textile covering.

6. The vehicle accessory according to claim 5
wherein each of the plurality of strap structures is a mechanical structure;
wherein each of the plurality of strap structures is a fastening device;
wherein each of the plurality of strap structures secures the composite textile covering the center console;

wherein each of the plurality of strap structures attaches to the skirt.

7. The vehicle accessory according to claim 6
wherein the composite textile covering comprises a superior sheeting, a cushion, and an inferior sheeting;
wherein the cushion is sandwiched between the superior sheeting and the inferior sheeting to form the composite textile structure of the composite textile covering.

8. The vehicle accessory according to claim 7
wherein the plurality of strap structures comprises a first strap structure and a second strap structure;
wherein the first strap structure removably attaches the composite textile covering to the armrest formed by the center console;
wherein the second strap structure removably attaches the composite textile covering to the armrest formed by the center console.

9. The vehicle accessory according to claim 8
wherein the superior sheeting is a sheeting structure;
wherein the superior sheeting is a textile based structure;
wherein the superior sheeting is a flexible structure;
wherein the superior sheeting forms an exterior surface of the composite textile structure of the composite textile covering;
wherein the superior sheeting forms the visible surface of the composite textile covering when the composite textile covering encloses the armrest formed by the center console.

10. The vehicle accessory according to claim 9
wherein the inferior sheeting is a textile based structure;
wherein the inferior sheeting is a flexible structure;
wherein the inferior sheeting attaches to the superior sheeting to form a portion of the composite textile structure of the composite textile covering;
wherein the inferior sheeting forms the surface of the composite textile structure of the composite textile covering that is proximal to the armrest formed by the center console.

11. The vehicle accessory according to claim 10
wherein the cushion is an elastomeric pad;
wherein the cushion has a disk shape;
wherein the cushion is positioned within the composite textile covering such that the cushion covers the superior surface of the armrest formed by the center console;
wherein the cushion forms a protective structure.

12. The vehicle accessory according to claim 11
wherein the first strap structure is a fastening device;
wherein the first strap structure binds the composite textile covering to the armrest formed by the center console;
wherein the second strap structure is a fastening device;
wherein the second strap structure binds the composite textile covering to the armrest formed by the center console.

13. The vehicle accessory according to claim 12
wherein the first strap structure comprises a first webbing, a second webbing, and a first quick release buckle;
wherein the first webbing is a textile based structure;
wherein the first webbing is a flexible structure;
wherein the edge of the first webbing attaches to the skirt to form a fixed end;
wherein the free end of the first webbing is the edge of the first webbing that is distal from the fixed edge of the first webbing;
wherein the free end of the first webbing removably attaches to the second webbing to bind the composite textile covering to the armrest formed by the center console;
wherein the second webbing is a textile based structure;
wherein the second webbing is a flexible structure;
wherein the edge of the second webbing attaches to the skirt to form a fixed end;
wherein the free end of the second webbing is the edge of the second webbing that is distal from the fixed edge of the second webbing;
wherein the free end of the second webbing removably attaches to the free end of the first webbing to bind the composite textile covering to the armrest formed by the center console;
wherein the first quick release buckle removably attaches the free end of the first webbing to the free end of the second webbing to bind the first strap structure to the composite textile covering;
wherein the second strap structure comprises a third webbing, a fourth webbing, and a second quick release buckle;
wherein the third webbing is a textile based structure;
wherein the third webbing is a flexible structure;
wherein the edge of the third webbing attaches to the skirt to form a fixed end;
wherein the free end of the third webbing is the edge of the third webbing that is distal from the fixed edge of the third webbing;
wherein the free end of the third webbing removably attaches to the fourth webbing to bind the composite textile covering to the armrest formed by the center console;
wherein the fourth webbing is a textile based structure;
wherein the fourth webbing is a flexible structure;
wherein the edge of the fourth webbing attaches to the skirt to form a fixed end;
wherein the free end of the fourth webbing is the edge of the fourth webbing that is distal from the fixed edge of the fourth webbing;
wherein the free end of the fourth webbing removably attaches to the free end of the third webbing to bind the composite textile covering to the armrest formed by the center console;
wherein the second quick release buckle removably attaches the free end of the third webbing to the free end of the fourth webbing to bind the second strap structure to the composite textile covering.

14. The vehicle accessory according to claim 13
wherein the first quick release buckle comprises a first connector and a second connector;
wherein the first connector is the connector of the first quick release buckle that attaches to the free end of the first webbing;
wherein the second connector is the connector of the first quick release buckle that attaches to the free end of the second webbing;
wherein the first quick release buckle secures the free end of the first webbing to the free end of the second webbing by inserting the first connector into the second connector;
wherein the second quick release buckle comprises a third connector and a fourth connector;
wherein the third connector is the connector of the second quick release buckle that attaches to the free end of the third webbing;

wherein the fourth connector is the connector of the second quick release buckle that attaches to the free end of the fourth webbing;

wherein the second quick release buckle secures the free end of the third webbing to the free end of the fourth webbing by inserting the third connector into the fourth connector.

15. The vehicle accessory according to claim 14 wherein the superior sheeting further comprises a logo image;

wherein the logo image is an image that is formed on the visible surface of the superior sheeting;

wherein the logo image is positioned on the superior sheeting such that the logo image lays over the superior surface of the armrest formed by the center console.

* * * * *